US008906551B2

(12) United States Patent
Chan et al.

(10) Patent No.: US 8,906,551 B2
(45) Date of Patent: Dec. 9, 2014

(54) ALLOYS OF CLATHRATE ALLOTROPES FOR RECHARGEABLE BATTERIES

(75) Inventors: Candace K. Chan, Phoenix, AZ (US); Michael A. Miller, San Antonio, TX (US); Kwai S. Chan, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 280 days.

(21) Appl. No.: 13/452,403

(22) Filed: Apr. 20, 2012

(65) Prior Publication Data

US 2013/0280609 A1 Oct. 24, 2013

(51) Int. Cl.
H01M 4/13 (2010.01)
H01M 4/134 (2010.01)

(52) U.S. Cl.
CPC .................................. *H01M 4/134* (2013.01)
USPC ..... 429/218.1; 429/209; 429/217; 252/182.1; 423/348; 204/280

(58) Field of Classification Search
None
See application file for complete search history.

(56) References Cited

U.S. PATENT DOCUMENTS

| 5,800,794 | A | 9/1998 | Tanigaki et al. |
| 6,188,011 | B1 | 2/2001 | Nolas et al. |
| 6,423,286 | B1 | 7/2002 | Gryko |
| 6,461,581 | B1 | 10/2002 | Eguchi et al. |
| 6,525,260 | B2 | 2/2003 | Yamashita et al. |
| 6,797,199 | B2 | 9/2004 | Eguchi et al. |
| 7,534,414 | B2 | 5/2009 | Nolas et al. |
| 8,722,247 | B2 | 5/2014 | Miller et al. |
| 2003/0197156 | A1 | 10/2003 | Eguchi et al. |
| 2008/0226836 | A1 | 9/2008 | Nolas et al. |
| 2011/0226299 | A1 | 9/2011 | Makansi |
| 2011/0253205 | A1 | 10/2011 | Grossman et al. |
| 2012/0021283 | A1 | 1/2012 | Chan et al. |
| 2012/0295160 | A1 | 11/2012 | Miller et al. |

FOREIGN PATENT DOCUMENTS

WO 2013158307 A1 10/2013

OTHER PUBLICATIONS

Wen, et al., "Chemical diffusion in intermediate phases in the lithium-silicon system." J. Solid State Chem. 1981, 37, 271-278.
Timmons, et al., Isotropic volume expansion of particles of amorphous metallic alloys in composite negative electrodes for Li-ion batteries. J. Electrochem. Soc. 2007, 154, A444-A448.
Beattie, et al., "Si electrodes for Li-ion batteries—A new way to look at an old problem." J. Electrochem. Soc. 2008, 155 (2), A158-A163.
Eom, et al., "Electrochemical insertion of lithium into multiwalled carbon nanotube/silicon composites produced by ballmilling." J. Electrochem. Soc. 2006, 153 (9), A1678-A1684.
Zhang, "Composite anode material of silicon/graphite/carbon nanotubes for Li-ion batteries." Electrochim. Acta 2006, 51, 4994-5000.
Zhang et al., "Pyrolytic carbon-coated silicon/carbon nanotube composites: promising application for Li-ion batteries." Int. J. Nanomanufacturing 2008, 2 (1/2), 4-15.

(Continued)

*Primary Examiner* — Milton I Cano
*Assistant Examiner* — Wojciech Haske
(74) *Attorney, Agent, or Firm* — Grossman, Tucker et al

(57) ABSTRACT

The present disclosure is directed at an electrode for a battery wherein the electrode comprises clathrate alloys of silicon, germanium or tin. In method form, the present disclosure is directed at methods of forming clathrate alloys of silicon, germanium or tin which methods lead to the formation of empty cage structures suitable for use as electrodes in rechargeable type batteries.

11 Claims, 2 Drawing Sheets

(56) References Cited

OTHER PUBLICATIONS

Lewis, "In situ AFM measurements of the expansion and contraction of amorphous Sn-Co-C films reacting with lithium." J. Electrochem. Soc. 2007, 154 (3), A213-A216.

Timmons, et al., "In situ optical observations of particle motion in alloy negative electrodes for Li-ion batteries." J. Electrochem. Soc. 2006, 153, A1206-A1210.

Ryu, et al., "Failure Modes of Silicon Powder Negative Electrode in Lithium Secondary Batteries." Electrochem. Solid-State Lett. 2004, 7 (10), A306-A309.

Adams, et al., "Wide-band-gap Si in opne four-fold-coordinated clathrate structures Physical Review," B. 1994, 49, 8084-8053.

Melinon, et al., "Phonon density of states of silicon clathrates: characteristic width narrowing effect with respect to the diamond phase." Physical Review B. 1999, 59, 10 099-10 103.

Manthiram, et al., "Low temperature synthesis of insertion oxides for lithium batteries." Chem. Mater. 1998, 10, 2895-2909.

San-Miguel, et al., "High-pressure properties of group IV clathrates." High Pressure Research 2005, 25(3), 159-185.

Grovenstein, et al., "Cleavage of tetraalkylammonium halides by sodium in liquid ammonia" J. Am. Chem. Soc. 1959, 81, 4850-4857.

Nakano, et al., "Soft xray photoelectron spectroscopy in silicon clathrate superconductors," SPring-8 Res Front 2001B/2002A, p. 51-53 (2003).

Brooksbank et al., Tessellated Stresses Associated With Some Inclusions in Steel, Journal of the Iron and Steel Institute, Apr. 1969, pp. 474-483.

Chan et al., High-performance lithium battery anodes using silicon nanowires, nature nanotechnology—Letters, Jan. 2008, pp. 31-35, vol. 3.

Connetable et al., Superconductivity in Doped sp3 Semiconductors: The Case of the Clathrates, The American Physical Society—Physical Review Letters, Dec. 12, 2003, pp. 247001-1-247001-4, vol. 91, No. 24.

CPMD—Car-Parrinello Molecular Dynamics—Manual, an ab initio Electronic Structure and Molecular Dynamics Program, The CPMD consortium, Sep. 4, 2008, 258 pages.

Cui et al., Crystalline-Amorphous Core-Shell Silicon Nanowires for High Capacity and High Current Battery Electrodes, American Chemical Society—Nano Letters, Dec. 1, 2008, 5 pages.

Graetz et al., Highly Reversible Lithium Storage in Nanostructured Silicon, Electrochemical and Solid-State Letters, 2003, A194-A197, vol. 6 (9).

Green et al., Structured Silicon Anodes for Lithium Battery Applications, Electrochemical and Solid-State Letters, 2003, A75-A79, vol. 6 (5).

Huggins et al., Decrepitation Model for Capacity Loss During Cycling of Alloys in Rechargeable Electrochemical Systems, Ionics, 2000, 8 pages, vol. 6.

Takamura et al., A vacuum deposited Si film having a Li extraction capacity over 2000 mAh/g with a long cycle life, Journal of Power Sources, 2004, pp. 96-100, vol. 129.

Yang et al., Small particle size multiphase Li-alloy anodes for lithium-ion-batteries, Solid State Ionics, 1996, pp. 281-287, vol. 90.

Kim et al., Three-Dimensional Porous Silicon Particles for Use in High-Performance Lithium Secondary Batteries, Angewandte Chemie—Anode Materials, 2008, pp. 10151-10154, vol. 47.

Miguel et al., A New Class of Low Compressibility Materials: Clathrates of Silicon and Related Materials, High Pressure Research, 2002, pp. 539-544, vol. 22.

Imai et al., Synthesis of a Si-clathrate Compound, Sr8GaxSi46-x, and its Electrical Resistivity Measurements; Elsevier Science, Journal of Alloys and Compounds 335 (2002) pp. 270-276.

Tsujii et al., Phase Stability and Chemical Composition Dependence of the Thermoelectric Properties of the Type-I Clathrate Ba8AlxSi45-x ($8 \leq x \leq 15$); Elsevier Science, Journal of Solid State Chemistry 184 (2011) pp. 1293-1303.

Yoshio, et al, "Lithium-Ion Batteries, Science and Technologies", 2009 Springer ISBN: 978-0-387-34444-7, e-ISBN: 978-0-387-34445-4, DOI: 10,1007/978-0-387-34445-4.

International Search Report and Written Opinion of the ISA/KR (12 pgs); mail date Jun. 25, 2013; issued in related matter PCT/US2013/032430.

U.S. Office Action issued Mar. 19, 2013 in U.S. Appl. No. 12/842,224 (10 pgs).

U.S. Office Action issued Jun. 26, 2013 in U.S. Appl. No. 13/109,704 (16 pgs).

U.S. Office Action issued Oct. 31, 2013 in U.S. Appl. No. 12/842,224 (12 pgs).

U.S. Office Action issued May 12, 2014 in U.S. Appl. No. 12/842,224 (13 pgs).

ALLOYS OF CLATHRATE ALLOTROPES FOR RECHARGEABLE BATTERIES

GOVERNMENT SUPPORT CLAUSE

This invention was made with United States Government support under Contract No. DEAC0205CH11231 from the Department of Energy. The Government has certain rights in this invention.

FIELD OF THE INVENTION

The present invention relates to alloy cage structures of silicon, germanium and/or tin for use as an anode (negative electrode) and/or cathode (positive electrode) in rechargeable batteries. Such compositions may therefore provide electrode materials with improvement in capacity, energy density and stability over battery materials currently employed.

BACKGROUND

There is a need for new electrode materials with the capacity for lithium ions such that relatively higher energy densities can be realized. For example, work on improving graphite anodes in present-day batteries, which have a theoretical capacity of 372 mAh/g, and the current intercalation cathode, such as $LiCoO_2$, has identified several potential candidates.

Lithium-ion batteries are a family of rechargeable battery types in which lithium ions move from a negative electrode to the positive electrode during discharge, and back when charging. More specifically, during discharge, lithium ions $Li^+$ carry current from the negative to the positive electrode through a non-aqueous electrolyte and separator diaphragm. The three primary functional components of the lithium-ion battery are therefore the anode, cathode and electrolyte.

Carbon or graphite has emerged as one of the most popular material for the anode. The cathode is generally one of three materials: a layered oxide (such as lithium cobalt oxide), a polyanion (such as lithium iron phosphate) or a spinel (such as lithium magnesium oxide). Electrolytes may typically be selected from mixtures of organic carbonates such as ethylene carbonate or diethyl carbonate containing salts of lithium ions such as lithium hexafluorophophate.

Both the anode and cathode are therefore materials where the lithium may reversibly migrate. During insertion, lithium moves into the electrode. During extraction, lithium moves back out. The cathode half reaction may be written as:

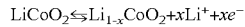

$$LiCoO_2 \leftrightarrows Li_{1-x}CoO_2 + xLi^+ + xe^-$$

The anode half reaction may be written as:

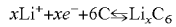

$$xLi^+ + xe^- + 6C \leftrightarrows Li_xC_6$$

The overall reaction may be written as:

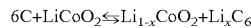

$$6C + LiCoO_2 \leftrightarrows Li_{1-x}CoO_2 + Li_xC_6$$

As noted above, there remains an ongoing need for higher specific capacity materials for higher energy density lithium-ion batteries. Work therefore continues on improving the carbon/graphite anode, which has a theoretical capacity of 372 mAh/g. However, the problems that are associated with finding a replacement material include identifying elements that, when participating in reversible reactions with lithium, do so in a manner that will not compromise anode performance.

In that regard, attention is directed to U.S. application Ser. No. 12/842,224 entitled "Silicon Clathrate Anodes For Lithium Ion Batteries" which among other things, was directed at electrodes comprising cage structures such as silicon clathrate particles. Attention is also directed to U.S. application Ser. No. 13/109,704 entitled "Clathrate Allotropes For Rechargeable Batteries" which among other things, was directed to cage structures of germanium and/or tin for use as an anode (negative electrode) and/or cathode (positive electrode) in rechargeable batteries.

The present disclosure now identifies beneficial attributes and utility of alloy cage structure of silicon, germanium and/or tin for electrode use in rechargeable batteries.

SUMMARY

The present disclosure is directed to an electrode for a battery wherein said electrode comprises clathrate alloys of silicon, germanium and/or tin. The Type I clathrate alloy structures may include an arrangement of silicon, germanium or tin as a 20 atom and 24 atom cage fused together through 5 atom pentagonal rings. The Type II clathrate alloy structures may comprise an arrangement of 20-atom and 28-atom cages fused together through 5 atom pentagonal rings.

The Type 1 clathrate alloy may have the formula $A_xM_yX_{46-y}$ where A=Li with none, one or more guest atoms from group 1A, group 2A, group 1B, group 2B, group 3B, group 5A, group 7A and group 8; M=B, Al, P, S, Cu, Ni, Zn, Ag, Au, Pt, Ga, Se or any metal or metalloid element capable of forming a clathrate with X wherein X=Si, Ge and/or Sn and M≠X≠A and y is an integer, a fraction or a number plus a fractional part. The value of x is reference to the number of Li atoms intercalated within the cage.

The Type II clathrate alloy structure may have the formula $A_xM_yX_{34-y}$ where A=Li with none, one or more guest atoms from group 1A, group 2A, group 1B, group 2B, group 3B, group 5A, group 7A and group 8; M=B, Al, P, S, Cu, Ni, Zn, Ag, Au, Pt, Ga, Se or any metal or metalloid element capable of forming a clathrate with X wherein X=Si, Ge and/or Sn and M≠X≠A and y is an integer, a fraction or a number plus a fractional part. Again, the value of x is reference to the number of Li atoms intercalated within the cage.

The present disclosure also relates to a method of forming a Type I empty clathrate of silicon, germanium or tin, or alloy thereof comprising the following scheme:

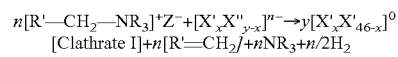

$$n[R'—CH_2—NR_3]^+Z^- + [X'_xX''_{y-x}]^{n-} \rightarrow y[X'_xX'_{46-x}]^0$$
$$[\text{Clathrate I}] + n[R'=CH_2/+nNR_3 + n/2H_2$$

R'=—$(CH_2)_n$—$CH_3$;

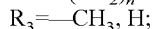

$R_3$=—$CH_3$, H;

X' or X"=Si, Ge, or Sn, and X'≠X";

Z=halogen or any other negatively charged counter-ion;

y in $[X'_xX''_{y-x}]^{n-}$ and in $y[X'_xX''_{46-x}]^0$=a number corresponding to a stable cluster size (e.g., y=2 for $Si_2^{2-}$ or y=9 for $Si_9^{4-}$, or other stable cluster size);

$n^-$ in $[X'_xX''_{y-x}]^{n-}$=the formal charge of a stable cluster anion that depends on n, the starting number of moles of an alkyl ammonium salt (e.g., for n=4 and y=9, then charged cluster is $[X'_xX''_{9-x}]^{4-}$);

n in 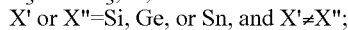 $n[R'—CH_2—NR_3]^+Z^-$=the starting number of moles of an alkyl ammonium salt (stoichiometrically limited by the relationship between a stable cluster size and its formal charge at that size);

wherein R' comprises any alkyl and/or branched alkyl and the value of n in R'=$(CH_2)_n$—$CH_3$ is 1-50 and R' when bonded to the indicated methylene group proceeds through a methine (—CH=) type linkage;

and incorporating the following steps:

(a) preparing an ionic liquid consisting of dodecyltrimethylammonium cation (DTMAC) and bis(trifluoromethylsulfonyl)imide anion (BTFMSI);

(b) combining said DTMAC-BTFMSI ionic liquid with alkali- or alkaline earth compounds of the metalloids $Q(X'_xX''_{2-x})$ or $Q_4(X'_xX''_{9-x})$, where Q=Li, Na, K, Rb, Cs, Fr, Be, Mg, Ca, Sr, Ba, and Ra; and X' or X''=Si, Ge, Sn, and X'≠X'', where x is an integer, a fraction, or a number plus a fractional part (such as the binary metalloids SiGe, SiSn, and GeSn, to form the charged cluster $[X'_xX''_{y-x}]^{n-}$);

(c) in the absence of air or moisture, heating a reaction mixture of $n[R'-CH_2-NR_3]^+Z^- + [X'_xX''_{y-x}]^{n-}$ (d) forming the Type I empty clathrate of the form $[X'_xX''_{46-x}]^0$; x=0 to 46.

The above may then be followed by isolating the Type I empty clathrate product from the remaining liquid reaction mixture followed by forming an electrode and intercalcating with lithium by electrochemical methodology.

BRIEF DESCRIPTION OF THE DRAWINGS

The detailed description below may be better understood with reference to the accompanying figures which provide for illustrative purposes and are not considered as limiting any aspect of the invention.

DETAILED DESCRIPTION OF PREFERRED EMBODIMENTS

The present invention relates to cage structures of clathrate allotrope alloys of Si, Ge and/or Sn for energy applications to include alloys of the Type I and Type II clathrate allotropes with various chemical compositions as described more fully below. Accordingly, the present invention ultimately relates to the practical formation of lithium-ion batteries comprising an anode containing alloys of silicon, germanium and/or tin, including a cathode and an electrolyte.

Clathrate is a general reference herein to a compound where one component (atomic or molecular) may be enclosed within the framework of another. Cage structures, such as silicon, germanium and/or tin clathrate alloys are disclosed herein as electrode materials which may then be utilized in lithium-ion batteries. For example, the clathrate alloys herein may be understood herein as containing $sp^3$ bonded silicon, germanium and/or tin atoms arranged in cage-structures. A cage structure is reference to a structure that may optionally trap and contain a second type of molecule. A clathrate alloy is reference to the feature that Si, Ge and/or Sn are not the only elements involved in the referenced cage structure formation. The ensuing discussion may, for exemplary purposes, reference non-alloy composition, but it may be understood that such discussion is now applicable to alloy type formulations.

Figure 1:
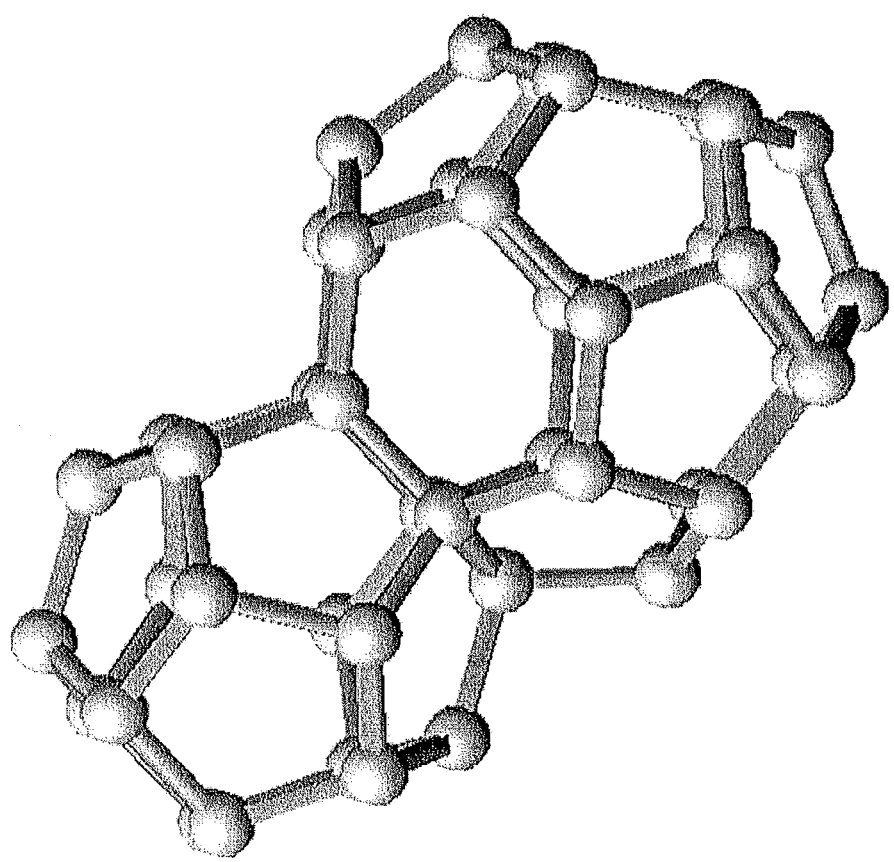
FIG. 1 illustrates Si20 and Si24 cages as the building of the representative Type I $Si_{46}$ clathrate alloy.
Figure 2:
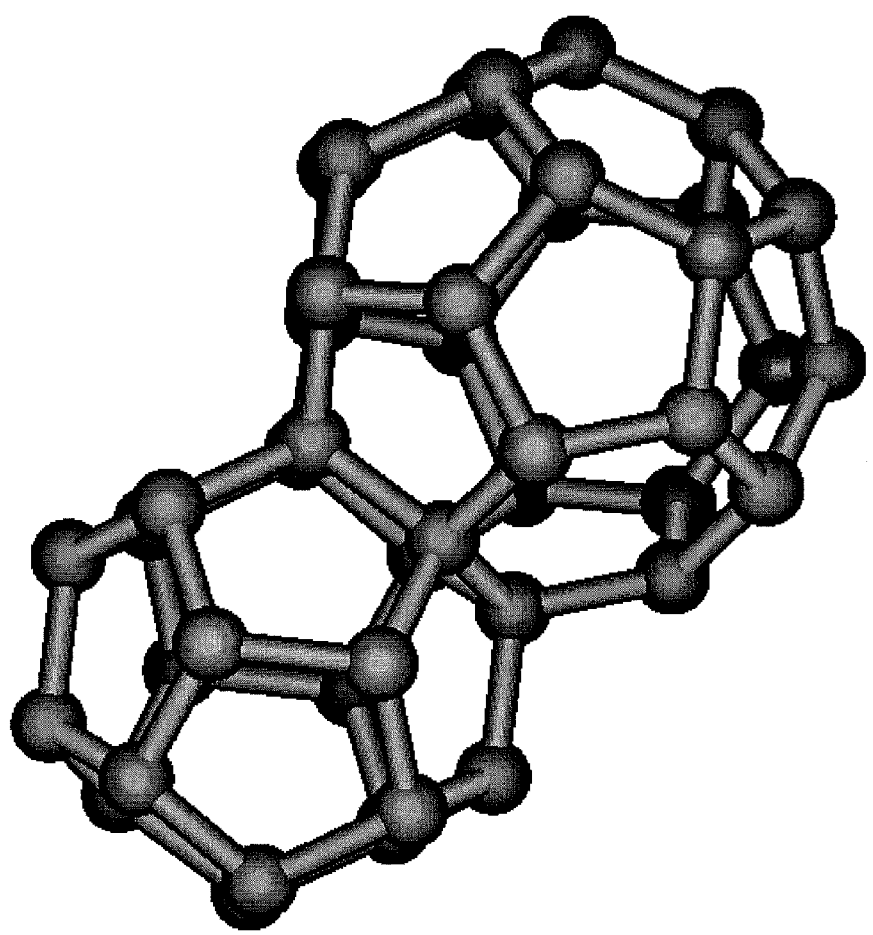
FIG. 2 illustrates Si20 and Si28 cages as the building of the representative Type II $Si_{34}$ (or $Si_{136}$) clathrate alloy.

Accordingly, by way of representative discussion as applied to the alloys herein, Type I silicon clathrate $Si_{46}$ or Type I germanium clathrate or Type I tin clathrate comprises crystalline Si, Ge or Sn with a regular arrangement of 20-atom and 24-atom cages fused together through 5 atom pentagonal rings. Silicon clathrate $Si_{46}$ may be identified as $Si_{46}$ clathrate and may also be identified with the Pearson Symbol cP46. FIG. 1 is a representation of a face-sharing $Si_{20}$ and $Si_{24}$ cages as the building unit of the $Si_{46}$ clathrate. In addition, it should be noted that preferably, the silicon clathrate cage structures are such that they may or may not include guest atoms (e.g. atoms from group 1A, group 2A, group 1B, group 2B, group 3B, group 5A, group 7A and group 8) encapsulated within the clathrate lattice.

A $Si_{46}$ clathrate may be further described as having a simple cubic structure with a lattice parameter of 10.335 Å and 46 Si atoms per unit cell. The crystal structure of the $Si_{46}$ clathrate belongs to the Space group $Pm\bar{3}n$ and Space Group Number 223. The crystal structure of the silicon clathrate ($Si_{46}$) is different from the common form of crystalline Si (c-Si), which is diamond cubic with a lattice parameter of about 5.456 Å and belongs to the Space Group $Fd\bar{3}m$, Number 227.

Another representative form of clathrate is $Si_{34}$ (Type II clathrate) that contains crystalline Si with a regular arrangement of 20 atoms and 28 atom cages fused together through 5 atom pentagonal rings. The $Si_{34}$ clathrate has a face-centered cubic (fcc) structure, with 34 Si atoms per fcc unit cell or 136 atoms per cubic unit cell. Type II clathrate can be referred to as $Si_{34}$ or $Si_{136}$. The $Si_{34}$ clathrate has a lattice parameter of 14.62 Å and belongs to the Space Group $Fd\bar{3}m$, Number 227. A third form of silicon clathrate is a modification of the $Si_{46}$ type formed by removing four atoms from the 24-atom cages.

Group IV clathrates may be viewed as open, nano-cage structures with relatively strong covalent bonds allowing for the endohedral intercalcation of atoms. The crystallographic and physical properties of Group IV Type I clathrates are presented in Table 1:

TABLE 1

Crystallographic Properties And The Calculated Volumes And $Li^+$ Occupancies Of Group IV Clathrates

| Element | Clathrate | Type | Space Group | Lattice Constant, $a_0$ (Å) | Predicted Volumes (Å³/u.c.) | | | $Li^+$ Probe (Å³) | No. of $Li^+$ |
|---|---|---|---|---|---|---|---|---|---|
| | | | | | Total Cell | Available | Occupiable | Accessible | |
| C | $C_{46}$ | I | $Pm\bar{3}n$ | 6.833 | 319.03 | 12.28 | 0.23 | 0 | 1.84 | 0 |
| | $C_{136}$ | II | $Fd\bar{3}m$ | 9.472 | 849.82 | 30.7 | 1.07 | 0 | 1.84 | 0 |
| Si | $Si_{46}$ | I | $Pm\bar{3}n$ | 10.355 | 1110.33 | 169.51 | 47.76 | 42.9 | 1.84 | 23 |
| | $Si_{136}$ | II | $Fd\bar{3}m$ | 14.62 | 3124.94 | 429.94 | 119.56 | 4.35 | 1.84 | 2 |
| Ge | $Ge_{46}$ | I | $Pm\bar{3}n$ | 10.66 | 1211.36 | 699.01 | 312.13 | 312.13 | 1.84 | 169 |
| Sn | $Sn_{46}$ | I | $Pm\bar{3}n$ | 12.04 | 1745.34 | 433.7 | 165.81 | 146.26 | 1.84 | 79 |

Using these properties, computations of the total cell volume, available volume, occupiable volume, and accessible volume within the clathrate allotropes (Type I and Type II) and the common structures may now be used to compare the ability with which $Li^+$ may be inserted into these structures. The occupiable and accessible volumes of crystal lattices were computed in which the radial distance between non-bonded interactions of a $Li^+$ probe-sphere of ionic radius 0.76 Å and the atomic framework determine the number of probes (i.e., lithium ions) that can occupy the lattice empty volume. The available cell volume is further computed from the van der Waals isosurface and represents the total free volume of a lattice per unit cell (u.c.) independent of the probe interactions; i.e., the volume not occupied by atoms. The occupiable volume may be understood to reflect the total volume that may be occupied by the probe within the volume not already occupied by lattice atoms, whereas the accessible volume reflects the volume region accessible to the probe diffusing into the lattice from the exterior. In the latter case, some volume regions which were occupiable may become inaccessible if they cannot be physically reached by the probe from the outside. The available and occupiable volumes are larger for $Ge_{46}$ than the clathrate I structures of C, Si, and Sn because the van der Waals radius of Ge (1.39 Å) is smaller than that of C (1.7 Å), Si (2.1 Å), and Sn (2.17 Å).

Building on the above, computational studies of the Type I clathrate allotropes of silicon ($Si_{46}$), germanium ($Ge_{46}$) and tin ($Sn_{46}$) confirm the capacity of such structures yielding $Li^+$ (accessible) occupancies of 23 ($Li_{23}Si_{46}$), 169 ($Li_{169}Ge_{46}$) and 79 ($Li_{79}Sn_{46}$) which equate to (theoretical) specific gravimetric capacities ranging from 388 to 1357 mA h/g. Such clathrate compounds are relatively stable thermodynamically and undergo relatively small volume changes upon intercalcation/deintercalcation of $Li^+$, thereby exhibiting relatively high mechanical stability and resistance to pulverization.

Accordingly, in the broad context of the present disclosure the silicon, germanium or tin clathrate alloys herein may be understood as a clathrate alloy that, when configured into an electrode, and upon intercalcation of lithium (lithiation), undergoes a volume expansion of less than or equal to 50.0%, or in the range of 0.1% to 50.0% at 0.1% increments. In related context, the clathrate alloy structures herein are such that upon deintercalcation, undergo a volume change (contraction) of 50.0% or less, or in the range of 0.1% to 50.0% at 0.1% increments.

Type I Clathrate Alloy Structures

Type I clathrate alloy structures herein are preferably represented by the formula $A_xM_yX_{46-y}$ where A=Li with none, one or more guest atoms from group 1A, group 2A, group 1B, group 2B, group 3B, group 5A, group 7A and group 8; M=B, Al, P, S, Cu, Ni, Zn, Ag, Au, Pt, Ga, Se or any metal or metalloid element capable of forming a clathrate with X wherein X=Si, Ge and/or Sn ($M \neq X \neq A$). In addition, y may be an integer, a fraction or a number plus a fractional part.

Representative examples therefore include, but are not limited to, $Li_xAl_6Si_{40}$, $Li_xCu_8Si_{38}$, $Li_xSn_6Ge_{40}$, $Li_xGa_6Ge_{40}$ or similar permutations of A, M and X. In addition, it should be understood that M and X preferably constitute clathrate crystallographic structure belonging to space group Pm3̄n. In addition, $Li_x$ in the formula $Li_xM_yX_{46-y}$ represent relatively free and diffusible guest atoms occupying the void volume of the clathrate cages. Beside Li, other guest from group 1A, group 2A, group 1B, group 2B, group 3B, group 5A, group 7A and group 8 may or may not be present inside the cage. The number of Li atom, x, intercalcated within the cage may depend upon the specific form and stoichiometric ratio of M to X. However, preferably, x is limited to a value defined by the onset of significant expansion of the lattice parameter, beyond which irreversible structural damage is likely to occur in the bulk cage material. Such significant expansion is contemplated to occur at an expansion level of 100% in volume.

Type II Clathrate Alloy Structures

Type II clathrate alloy structures herein are preferably represented by the formula $A_xM_yX_{34-y}$ where A=Li with none, one or more guest atoms from group 1A, group 2A, group 1B, group 2B, group 3B, group 5A, group 7A and group 8; M=B, Al, P, S, Cu, Ni, Zn, Ag, Au, Pt, Ga, Se or any metal or metalloid element capable of forming a clathrate with X wherein X=Si, Ge and/or Sn and $M \neq X \neq A$ and y is an integer, a fraction or a number plus a fractional part. The preferred metals or metalloids contemplated for the Type II structures are the same as noted above for the Type I structures.

Representative examples therefore include, but are not limited to, $Li_xAl_4Si_{30}$, $Li_xCu_6Si_{28}$, $Li_xSn_4Ge_{30}$, $Li_xGa_4Ge_{30}$ or similar permutations of M and X. Preferably, M and X constitute the clathrate crystallographic structure belonging to the space group Fd3̄m. In addition, $Li_x$ in the formula $Li_xM_yA_{34-y}$ represent relatively free and diffusible guest atoms occupying the void volume of the clathrate cages. Beside Li, other guest atoms from group 1A, group 2A, group 1B, group 2B, group 3B, group 5A, group 7A, and group 8 may or may not be present inside the cage. As noted above for Type I clathrates, the number of Li atoms, x, intercalcated may also depend on the specific form and stoichiometric ratio of M and X and is again limited to a value defined by the onset of significant expansion of the bulk cage material. Such significant expansion for the Type II materials herein is contemplated to occur at an expansion level of 100% in volume.

There are now a number of advantages that may be identified for the clathrate alloys of the Type I and Type II structure noted herein. In such structures, the band structure, and in particular, the electrochemical work functions of the anode and cathode for combinations of electrodes may be tuned (element selection for the alloys) to be compatible with the rest of the battery system. This includes tuning of the absolute energies of the highest occupied molecular orbital (HOMO) and the lowest unoccupied molecular orbital (LUMO) of the available electrolyte. This tunability of the anode and cathode may be achieved be adjusting the stoichiometric ratio of the "M" to "X" in the referenced equations ($Li_xM_yX_{46-y}$ or $Li_xM_yX_{34-y}$) such that a desired open-circuit potential is obtained in the charged state of the battery within the thermodynamically stable energy range of the electrolyte.

Accordingly, utilizing an appropriate ratio and or elemental form of "M" to "X" may now yield a relatively small work function necessary for the clathrate-alloy composition to perform as an anode, wherein a different ratio and or elemental form of "M" to "X" may be employed to yield a relatively large work function necessary for the clathrate-alloy to perform as a cathode. The battery couple (anode+cathode) that results is therefore based on a single general class of material chemistry through which ratios and elemental forms of "M" to "X" can be selected to optimize rechargeable battery construction.

The present disclosure now describes the synthesis of the Type I and Type II clathrate alloy allotropes of silicon, germanium and tin. These synthetic schemes should be understood as preferred and therefore exemplary in nature and the preparation of the indicated structures should not be viewed as limiting.

High Energy Synthesis

High energy synthesis described herein refers to the allotropic transformation of an initial structure to the desired one via a relatively high-pressure mechanical compression of a solid substance at elevated temperature. Accordingly, one may employ pressures at or above 3 GPa and at temperatures at or above 700° C., or more preferably pressures in the range of 3 GPa to 6 GPa and temperatures in the range of 700° C. to 1000° C. Preferably, a Walker-type multi-anvil system is used in combination with an h-BN (hexagonal boron nitride) cell and carbon heater to symmetrically compress $BaSi_2$, $BaGe_2$, or BaSn₂ to pressures exceeding 3 GPa and temperatures exceeding 700° C., thus facilitating the structural transformation of the silicide, germanide, or stannide to the barium-intercalated clathrate I structures, respectively: $Ba_8Si_{46}$, $Ba_8Ge_{46}$, and $Ba_8Sn_{46}$. This method is capable of producing isomorphous material as determined by crystallographic techniques such as powder X-ray crystallography. The general equations that summarize the above may therefore be written as follows:

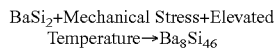

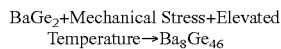

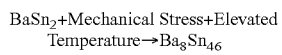

It is further noted that the choice of the barium compounds as starting materials is preferred in order to better enable relatively large-scale syntheses of the preferred clathrate I structures due to their improved chemical stability over, for example, the sodium compounds of silicide, germanide, and stannide (all of the common diamond allotrope). This enhanced stability over the sodium compounds may particularly facilitate relatively safe handling of the barium compounds thereby reducing the risk of ignition upon exposure to air or moisture or contamination due to oxidation (or both).

It may therefore be appreciated that one may now utilize $Ba_xM_yX_{46-y}$ wherein x is an integer, and M and X are as noted above for the Type I clathrates and y is also an integer, fraction or number plus a fractional part. Similarly, one may now utilize $Ba_xM_yA_{34-y}$ wherein x is an integer, and M and X are as noted above for the Type II clathrates and y is also an integer, fraction or number plus a fractional part.

Following synthesis of the said barium clathrate I and/or clathrate II alloy compounds as noted above, the removal of barium atoms from the host structure to yield the empty clathrate alloy may preferably proceed by one of two methods. By way of representative example, clathrate cages of the formula $Ba_8Al_xSi_{46-x}$ have been successfully prepared followed by replacement of the Ba with Li atoms.

1. Sublimation-Condensation

For example, a barium clathrate I alloy compound is placed in an h-BN vacuum vessel coupled to a carbon heater and a cryosorption pump. The sample is heated 600-800° C. under high vacuum (~10⁻⁶ Torr) for several hours. Under these conditions, enclathrated barium is sublimed and then condensed as Ba metal onto the molecular sieve material of the cryosorption pump away from the sample. The empty clathrate sample is then allowed to cool slowly at a rate of 1 K/min.

2. Electrochemical Deintercalcation

An electrochemical cell may be constructed for bulk electrochemical deintercalcation of $Ba^{2+}$ from the host clathrate and cathodic reduction to Ba metal onto a cathode electrode. In this apparatus, an anode is formed by compressing a barium clathrate sample into the form of a pellet or film in contact with an electrically conducting electrode. The cathode of this cell is formed from an electrically conducting, inert metal, which includes but is not limited to a foil, a rigid plate, or a screen. Both the anode and cathode are immersed in a non-aqueous electrolytic solution, such as an ionic liquid (e.g., 1-butyl-3-methylimidazolium hexafluorophosphate) or, for example, tetrabutylammonium hexafluorophosphate (TBAHFP) in acetonitrile. Using a potentiostat or galvanostat apparatus, $Ba^{2+}$ is deintercalcated from the host clathrate under anodic electrochemical conditions and is reduced as Ba metal at the cathode.

Direct Synthesis Via Hofmann-Type Reaction

Direct synthesis of guest-free clathrate I alloy structures of silicon, germanium, and tin may also be achieved as a batch heterogeneous reaction in solution. This may be accomplished according to the following general scheme:

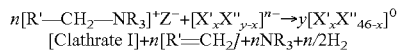
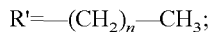
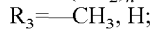
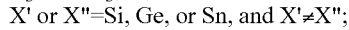

X' or X"=Si, Ge, or Sn, and X'≠X";

Z=halogen or any other negatively charged counter-ion;

y in $[X'_xX"_{y-x}]^{n-}$ and in $y[X'_xX"_{46-x}]^0$=a number corresponding to a stable cluster size; e.g., y=2 for $Si_2^{2-}$ or y=9 for $Si_9^{4-}$, or other stable cluster size;

n⁻ in $[X'_xX"_{y-x}]^{n-}$=the formal charge of a stable cluster anion that depends on n, the starting number of moles of an alkyl ammonium salt; e.g., for n=4 and y=9, then charged cluster is $[X'_xX"_{9-x}]^{4-}$;

n in $n[R'—CH_2—NR_3]^+Z^-$=the starting number of moles of an alkyl ammonium salt (stoichiometrically limited by the relationship between a stable cluster size and its formal charge at that size);

wherein R' comprises any alkyl and/or branched alkyl and the value of n in $R'=(CH_2)_n—CH_3$ is 1-50 and R' when bonded to the indicated methylene group proceeds through a methine (—CH=) type linkage;

With respect to the above, the following steps may then be implemented to form the Type I empty clathrate:

(a) preparing an ionic liquid consisting of dodecyltrimethylammonium cation (DTMAC) and bis(trifluoromethylsulfonyl)imide anion (BTFMSI);

(b) combining the said DTMAC-BTFMSI ionic liquid with alkali- or alkaline earth compounds of the metalloids $Q(X'_xX"_{2-x})$ or $Q_4(X'_xX"_{9-x})$, where Q=Li, Na, K, Rb, Cs, Fr, Be, Mg, Ca, Sr, Ba, and Ra; and X' or X"=Si, Ge, Sn, and X'≠X", where x is an integer, a fraction, or a number plus a fractional part, such as the binary metalloids SiGe, SiSn, and GeSn, to form the charged cluster $[X'_xX"_{y-x}]^{n-}$;

(c) in the absence of air or moisture, heating a reaction mixture of $n[R'—CH_2—NR_3]^+Z^-+[X'_xX"_{y-x}]^{n-}$;

(d) forming the Type I empty clathrate of the form $[X'_xX"_{46-x}]^0$; x=0 to 46; and (e) isolating the Type I empty clathrate product from the remaining liquid reaction mixture.

The above may then be followed by formation of an electrode from the isolated Type I empty clathrate and then intercalcating the guest sites of such electrode material with lithium by electrochemical methodology.

Pulsed Laser Synthesis

Ultrafast pulsed-laser ablation may also be preferably used to directly synthesize guest-free clathrate I and II alloy structures of silicon, germanium, and tin. The technique preferably utilizes relatively high-intensity picosecond-duration and monochromatic laser pulses delivered onto a target (silicon, germanium, or tin) at rates of several tens of MHz. For example, one may expose silicon, germanium or tin to a laser pulse for a duration in the range of 1 fs (femtosecond) to 1 μs (microsecond). Using those wavelengths in resonance with the photoexcitation manifolds or ionization energies of electrons in the target material, such processes may be used advantageously to cause bonds to break and material to vaporize with concurrent shock wave generation (photoablative effect). A relatively small plasma plume may then be formed near the target surface which undergoes adiabatic cooling at a relatively high rate. The local temperatures and pressures generated at the target are relatively high. By reducing the laser pulse energy while maintaining optimum evaporation, the number of atoms ionized and evaporated by each pulse is relatively small without causing ejections of large lumps of materials from the target.

It may be understood that the above-described pulsed-laser ablation technique may be used with a single laser excitation source or in combination with additional pulsed-laser or continuous wave (CW) sources of different wavelengths as the primary excitation source. For example, the primary excitation source may generate an intense pulsed beam with a wavelength in the UV (e.g., 248 nm), while a second pulsed-laser excitation source operating at a near infrared (NIR) wavelength (e.g., 1065 nm) is directed at the UV-generated plasma plume. Secondary excitation of the UV-generated plasma plume by the NIR laser may be used advantageously to further control the ionization state of the plasma plume and its adiabatic cooling rate, leading to the desired allotropic transformation of the target material.

Another modification to the above technique and apparatus may include heating of the target material at elevated temperatures while irradiating it with a primary pulsed-laser source. This may be accomplished either by employing resistive elements in contact with the target material or via a CW laser at NIR or infrared wavelengths directed at the target material.

It is further contemplated that the clathrate alloys herein may also be prepared from the elements by an arc melt technique which has been employed in connection with the preparation of metallic- and refractory alloys. For example, structurally pure alloys of Type I clathrates of the formula $Sr_8Ga_xSi_{46-x}$, $Ba_8Al_xSi_{46-x}$, and $Ba_8Cu_xSi_{46-x}$, have been prepared by the arc melt technique.

As noted above, the cage structures such as the silicon, germanium or tin clathrate alloys described herein, may be supplied in particulate form with varying geometry (spherical, cylindrical, plate-like, etc.). The size of any particulate form may be such that the largest linear dimension is less than or equal to 100.0 µm. Preferably, for cylindrical particles the size may therefore be less than or equal to 100.0 µm, or fall within the range of 0.1 µm to 100.0 µm. For thin-film geometries, it is preferably that the largest linear dimension is less than or equal to 50 µm, e.g., in the range of 0.1-50.0 µm.

The particulate alloy cage structure may then be combined with a polymeric binder and optionally a conductive additive such as carbon black. Suitable polymeric binders for the anode herein may include polymeric materials such as poly (vinylidine) difluoride (PVDF) and carboxymethylcellulose (CMC). The level of particulate cage structure in such binder, such as the $Si_{46}$ clathrate, may be at a level up to 95.0% by weight. Accordingly, the cage structure in the binder may be at a level of 50.0%-95.0% by weight in any 1.0% increment. The electrically conductive additives which may promote electrical conductivity of the electrode herein may include, e.g., carbon black, carbon nanotubes, conductive nanofibers, graphite, graphene, etc. The conductive additives may be present at a level of up to 20.0% by weight. Accordingly, the conductive additives may be present at a level of 1.0%-20.0% by weight in increments of 0.1%.

The particulate alloy cage structure, polymer binder and optional conductive additive may be formed into a liquid or high viscosity paste form, optionally in the present of a solvent and then allowed to dry on a given conductive substrate to form an anode type electrode. The substrate may then be attached to (or make up) the current collector in a typical Li-ion battery. The materials for the substrate may therefore include, but are not limited to, stainless steel, copper, nickel, aluminum and other materials that are inert to lithium. The current collector can also comprise flexible materials such as elastomeric polymeric resins (e.g. polymeric materials that have an elongation of greater than 100% and which are then capable of recovering 75% or more of such elongation). Such elastomeric materials may be coated with a layer of metal, such as those noted above, in order to provide a requisite amount of electrical conductive capability for use within, e.g., a lithium-ion battery.

The cathode electrode herein may contain an electrode composed of powder composite materials that are typically employed in a Li-ion battery. Such material may therefore include $LiCoO_2$, $LiFePO_4$, $LiMnO_2$, $LiMn_2O_4$, and $LiNiO_2$. Between the two electrodes is an ionically conducting and electrically insulating electrolyte that facilitates transport of ions between the electrodes. This region preferably includes a membrane separator soaked with electrolyte. The electrolyte may preferably be a Li salt dissolved in an organic solvent. For example, the electrolyte may include 1M $LiPF_6$ in a 1:1 w/w ethylene carbonate/diethyl carbonate solvent. The electrolyte may also be a Li salt mixed with a solid ionically conducting material such as an electrically conductive polymer or inorganic type material.

The anode electrode alloys noted herein that are produced from the silicon, germanium and/or tin cage structures may be formed in relatively thin films for a Li and/or Li-ion battery. In such a configuration a film of the clathrate alloy structure may be deposited on the metal substrate which as noted, serves as the current collector. The thickness of such film may be less than or equal to 50.0 µm in thickness, such as in the range of 0.1-50.0 µm in thickness. A solid electrolyte may then be positioned on top of the clathrate anode and a cathode layer may be subsequently deposited on top of the solid electrolyte to form a Li or Li-ion battery cell. The electrolyte may include but not be limited to inorganic electrolytes such as LiPON. The cathode material, as noted herein, includes but is not limited to $LiCoO_2$, $LiFePO_4$, $LiMnO_2$, $LiMn_2O_4$, and $LiNiO_2$.

What is claimed is:

1. An electrode in an electrochemical battery wherein said electrode comprises clathrate alloys of silicon, germanium and/or tin of one of the following formulas:
    (a) Type I clathrate alloy $A_xM_yX_{46-y}$, wherein A=Li with none, one or more guest atoms selected from group 1A, group 2A, group 1B, group 2B, group 3B, group 5A, group 7A and group 8; M=Si, Ge, Sn, Al, Cu or Ga; X=Si, Ge and/or Sn wherein M≠X≠A; y is a number value greater than zero; and x is a number value; and
    (b) Type II clathrate alloy $A_xM_yX_{34-y}$, where A=Li with none, one or more guest atoms from group 1A, group 2A, group 1B, group 2B, group 3B, group 5A, group 7A and group 8; M=B, Al, P, S, Cu, Ni, Zn, Ag, Au, Pt, Ga, Se or any metal or metalloid element capable of forming a clathrate with X; X=Si, Ge or Sn wherein M≠X≠A; y is a number value greater than zero; and x is a number value.

2. The electrode of claim 1 wherein said alloy comprises particles having a largest linear dimension of in the range of 0.1 µm to 100.0 µm.

3. The electrode of claim 1 wherein said electrode comprises a metal substrate and said clathrate alloy is present on the surface of said metal substrate.

4. The electrode of claim 1 wherein lithiation of said alloy results in a volume expansion of less than or equal to 50.0%.

5. The electrode of claim 1 wherein said electrode comprises an anode electrode in a Li battery.

6. The electrode of claim 1 wherein said electrode comprises a cathode electrode in a Li battery.

7. The electrode of claim 1 comprising a Type I clathrate alloy containing an arrangement of 20-atom and 24-atom cages fused together through 5 atom pentagonal rings.

8. The electrode of claim 7 wherein said Type I clathrate alloy has the formula:

$$A_xM_yX_{46-y}.$$

9. The electrode of claim 1 comprising a Type II clathrate alloy containing an arrangement of 20-atom and 28-atom cages fused together through 5 atom pentagonal rings.

10. The electrode of claim 1 wherein said Type II clathrate alloy has the formula:

$$A_xM_yX_{34-y}.$$

11. A lithium-ion battery comprising:
an anode containing clathrate alloys of silicon, germanium and/or tin, of one of the following formulas:

(a) Type I clathrate alloy $A_xM_yX_{46-y}$, wherein A=Li with none, one or more guest atoms selected from group 1A, group 2A, group 1B, group 2B, group 3B, group 5A, group 7A and group 8; M=Si, Ge, Sn, Al, Cu or Ga; X=Si, Ge and/or Sn wherein M≠X≠A; y is a number value greater than zero; and x is a number value; and (b) Type II clathrate alloy $A_xM_yX_{34-y}$ where A=Li with none, one or more guest atoms from group 1A, group 2A, group 1B, group 2B, group 3B, group 5A, group 7A and group 8; M=B, Al, P, S, Cu, Ni, Zn, Ag, Au, Pt, Ga, Se or any metal or metalloid element capable of forming a clathrate with X; X=Si, Ge or Sn wherein M≠X≠A; y is a number value greater than zero; and x is a number value;

a cathode; and
an electrolyte.

* * * * *